United States Patent
Sperber et al.

(10) Patent No.: US 7,206,921 B2
(45) Date of Patent: Apr. 17, 2007

(54) MICRO-OPERATION UN-LAMINATION

(75) Inventors: Zeev Sperber, Zichron Yaakov (IL);
Robert Valentine, Kyriat Tivon (IL);
Simcha Gochman, Timrat (IL)

(73) Assignee: Intel Corporation, Santa Clara, CA (US)

( * ) Notice: Subject to any disclaimer, the term of this patent is extended or adjusted under 35 U.S.C. 154(b) by 470 days.

(21) Appl. No.: 10/407,468

(22) Filed: Apr. 7, 2003

(65) Prior Publication Data

US 2004/0199748 A1    Oct. 7, 2004

(51) Int. Cl.
*G06F 9/30* (2006.01)

(52) U.S. Cl. .................................... 712/210; 712/212

(58) Field of Classification Search ............... 712/210, 712/211
See application file for complete search history.

(56) References Cited

U.S. PATENT DOCUMENTS

| | | | | |
|---|---|---|---|---|
| 5,918,031 | A * | 6/1999 | Morrison et al. | 712/208 |
| 5,968,163 | A * | 10/1999 | Narayan et al. | 712/204 |
| 6,014,741 | A * | 1/2000 | Mahalingaiah | 712/233 |
| 6,192,464 | B1 * | 2/2001 | Mittal | 712/200 |
| 6,233,671 | B1 * | 5/2001 | Abdallah et al. | 712/221 |
| 6,356,995 | B2 * | 3/2002 | Chen | 712/209 |
| 6,412,063 | B1 * | 6/2002 | Samra | 712/210 |
| 6,581,154 | B1 * | 6/2003 | Zaidi | 712/210 |
| 6,654,875 | B1 * | 11/2003 | Hartnett et al. | 712/211 |
| 6,820,190 | B1 * | 11/2004 | Knebel et al. | 712/215 |
| 6,845,441 | B2 * | 1/2005 | Cho | 712/208 |
| 6,918,027 | B2 * | 7/2005 | Mantey et al. | 712/37 |
| 2003/0236964 | A1 | 12/2003 | Madduri | |
| 2003/0236966 | A1 | 12/2003 | Samra et al. | |
| 2003/0236967 | A1 | 12/2003 | Samra et al. | |

* cited by examiner

*Primary Examiner*—Eddie Chan
*Assistant Examiner*—Jacob Petranek
(74) *Attorney, Agent, or Firm*—Pearl Cohen Zedek Latzer LLP

(57) ABSTRACT

A processor may include an instruction decoder to decode macroinstructions into micro-operations. In some embodiments, the instruction decoder may include a first decoder and a second decoder. The first decoder may decode a macroinstruction having SSE data type operands into a laminated micro-operation, and may generate unlamination information for the laminated micro-operation. The second decoder may generate from the laminated micro-operation and the unlamination information two or more micro-operations, where operands of the two or more micro-operations each correspond to a half of one of the SSE operands of the macroinstruction.

23 Claims, 7 Drawing Sheets

US 7,206,921 B2

MICRO-OPERATION UN-LAMINATION

BACKGROUND OF THE INVENTION

Processors may execute programs made of a sequence of macroinstructions. A processor may include a decoder to decode these macroinstructions into micro-operations, to be executed in an execution system of the processor.

The execution system may have a capacity to receive and execute more than one micro-operation in a time unit.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, components and circuits have not been described in detail so as not to obscure the embodiments of the invention.

It should be understood that embodiments of the invention may be used in any apparatus having a processor. Although embodiments of the invention are not limited in this respect, the apparatus may be a portable device that may be powered by a battery. A non-exhaustive list of examples of such portable devices includes laptop and notebook computers, mobile telephones, personal digital assistants (PDA), and the like. Alternatively, the apparatus may be a non-portable device, such as, for example, a desktop computer or a server computer.

Figure 1:
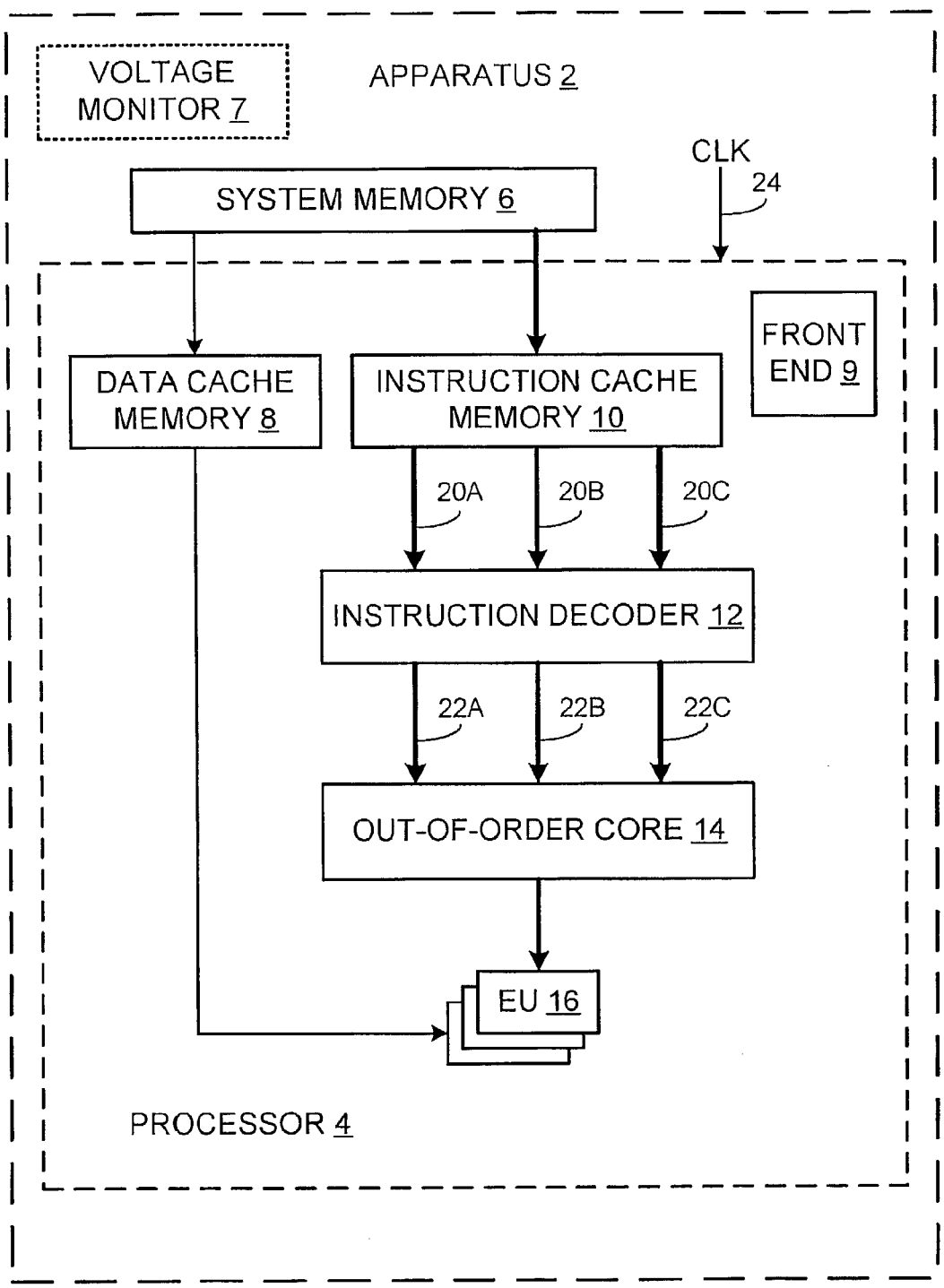
FIG. 1 is a block diagram of an apparatus including a processor in accordance with at least one embodiment of the invention.

As shown in FIG. 1, an apparatus 2 may include a processor 4 and a system memory 6, according to at least one embodiment of the invention. Well-known components and circuits of apparatus 2 and of processor 4 are not shown in FIG. 1 so as not to obscure the embodiments of the invention. Design considerations, such as, but not limited to, processor performance, cost and power consumption, may result in a particular processor design, and it should be understood that the design of processor 4 shown in FIG. 1 is merely an example and that embodiments of the invention are applicable to other processor designs as well.

Although embodiments of the invention are not limited in this respect, processor 4 may be, for example, a central processing unit (CPU), a digital signal processor (DSP), a reduced instruction set computer (RISC), a complex instruction set computer (CISC), and the like. Moreover, processor 4 may be part of an application specific integrated circuit (ASIC) or may be a part of an application specific standard product (ASSP).

Although embodiments of the invention are not limited in this respect, system memory 6 may be, for example, a dynamic random access memory (DRAM), a synchronous dynamic random access memory (SDRAM), a flash memory, a double data rate (DDR) memory, RAMBUS dynamic random access memory (RDRAM) and the like. Moreover, system memory 6 may be part of an application specific integrated circuit (ASIC) or may be a part of an application specific standard product (ASSP).

Apparatus 2 may also optionally include a voltage monitor 7.

System memory 6 may store macroinstructions to be executed by processor 4. System memory 6 may also store data for the macroinstructions, or the data may be stored elsewhere.

Processor 4 may include a data cache memory 8, a front end 9, an instruction cache memory 10, an instruction decoder 12, an out-of-order (OOO) core 14 and one or more execution units 16.

In the embodiment illustrated in FIG. 1, processor 4 may include execution units such as, for example, one or more integer execution units, one or more floating point execution units, one or more memory interface execution units, and the like, or any combination thereof.

Although embodiments of the invention are not limited in this respect, front end 9 may fetch macroinstructions and the data for those macroinstructions from system memory 6, and may store the macroinstructions in instruction cache memory 10 and the data for those macroinstructions in data cache memory 8, for use by processor 4.

Instruction decoder 12 may receive macroinstructions from instruction cache memory 10 via signals 20, and may decode each macroinstruction into one or more micro-operations ("u-ops"), depending upon the type of the macroinstruction, or according to some other criterion. A u-op is an operation to be executed by execution units 16. Each u-op may include operands and an op-code, where "op-code" is a field of the u-op defining the type of operation to be performed on the operands.

Although embodiments of the invention are not limited in this respect, at each cycle of a clock 24 ("clock cycle"), instruction decoder 12 may receive no macroinstructions or one macroinstruction via signals 20A, no macroinstructions or one macroinstruction via signals 20B and no macroinstructions or one macroinstruction via signals 20C. Consequently, at each clock cycle, instruction decoder 12 may receive no macroinstructions or up to three macroinstruction from instruction cache memory 10.

Although embodiments of the invention are not limited in this respect, at each clock cycle, instruction decoder 12 may send to OOO core 14 no u-op or one u-op via signals 22A, no u-op or one u-op via signals 22B and no u-op or one u-op via signals 22C. Consequently, at each clock cycle, instruction decoder 12 may send no u-ops or up to three u-ops to OOO core 14.

OOO core 14 may receive the u-ops from instruction decoder 12 and may choose one or more of execution units 16 to execute each u-op. OOO core 14 may then dispatch the u-ops to the chosen execution unit(s).

Although embodiments of the invention are not limited in this respect, OOO core 14 may have the capacity to receive three u-ops at each clock cycle from instruction decoder 12. When OOO core 14 receives three u-ops at each clock cycle from instruction decoder 12, the capacity of OOO core 14 may be fully utilized. However, when OOO core 14 receives from instruction decoder 12 fewer than three u-ops at a clock cycle, the capacity of OOO core 14 may not be fully utilized.

Instruction decoder 12 may receive from signals 20 macroinstructions to perform operations on operands of streaming single-instruction-multiple-data (SIMD) extensions (SSE) data type. In the specification, the term SSE is intended to include all extensions of SSE, for example, SSE2. An SSE data type may include, for example, 128 bits of data. The 128 bits may represent two 64-bit floating point operands, or sixteen 8-bit integers, or eight 16-bit integers, or four 32-bit integers or two 64-bit integers.

Although embodiments of the invention are not limited in this respect, the macroinstructions to perform operations on operands of SSE data type may be "register-to-register" or "register-to-memory" macroinstructions. A register-to-register macroinstruction may have its operands available in registers of processor 4 (not shown). A register-to-register macroinstruction having SSE data type operands representing integer operands may be executed by one or more integer execution units. A register-to-register macroinstruction having SSE data type operands representing floating point operands may be executed by one or more floating point execution units.

A register-to-memory macroinstruction may be similar to a register-to-register macroinstruction in that one of its operands may be available in a register of processor 4. However, the other operand of the register-to-memory macroinstruction may be stored in the main memory or in data cache memory 8. The operand stored in data cache memory 8 may be fetched by one or more memory interface execution units into a register of processor 4 before the execution continues as with a register-to-register macroinstruction.

The execution units of processor 4 may be tunable to execute u-ops having 128-bit operands. However, the execution units of processor 4 may be able to receive operands of 64-bits. A 64-bit operand may represent half of the 128-bit data type: a 64-bit integer or two 32-bit integers or four 16-bit integers or eight 8-bit integers or a single 64-bit floating point number.

Therefore, operations on SSE data type operands may be performed by two u-ops. The first u-op may operate on a first half of the 128 bits, and the second u-op may operate on a second half of the 128 bits, although embodiments of the invention are not limited in this respect.

Figure 6:
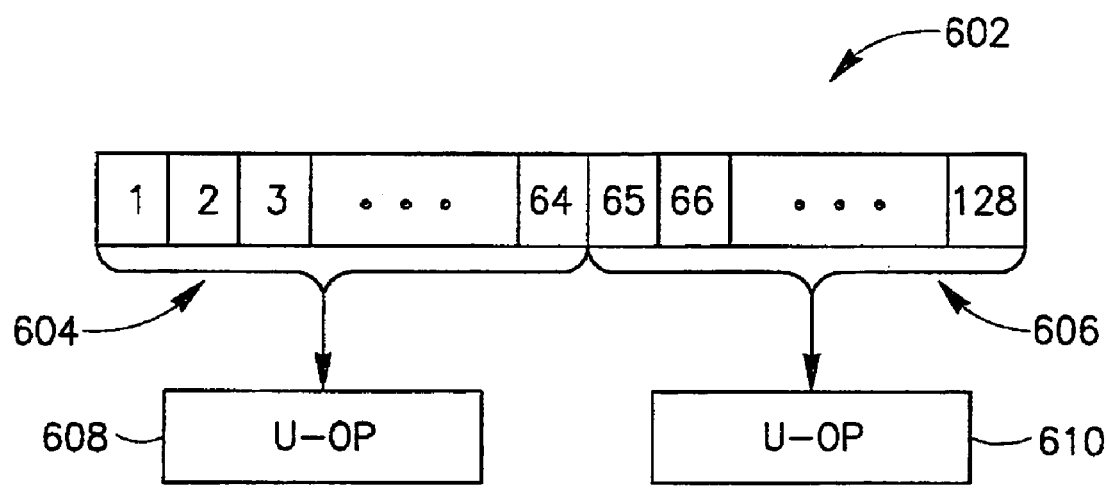
FIG. 6 is a conceptual illustration of micro-operations operating on a SSE operand according to some embodiments of the invention.

For example, as shown in FIG. 6 a first u-op 608 may operate on a first half 604 of a SSE data type operand 602, which may have, for example, 128 bits. A second u-op 610 may operate on a second half 606 of operand 602.

When instruction decoder 12 receives a register-to-register macroinstruction having SSE data type operands representing integer (floating point) operands, it may generate two u-ops to be executed by integer (floating point) execution units. The first u-op may operate on a first half of the 128-bit SSE operand, and the second u-op may operate on a second half of the 128-bit SSE operand. Although embodiments of the invention are not limited in this respect, the two u-ops generated from the register-to-register macroinstruction having SSE data type operands may be similar or substantially identical to each another.

When instruction decoder 12 receives a register-to-memory macroinstruction having SSE data type operands representing integer (floating point) operands, it may generate two u-ops to be executed by memory interface execution units and two u-ops to be executed by integer (floating point) execution units. The first u-op for a memory interface execution unit may fetch a first half of the 128-bit SSE operand, and the second u-op for a memory interface execution unit may fetch a second half of the 128-bit SSE operand. Similarly, the first u-op for an integer (floating point) execution unit may operate on a first half of the 128-bit SSE operand, and the second u-op for an integer (floating point) execution unit may operate on a second half of the 128-bit SSE operand. Although embodiments of the invention are not limited in this respect, the two u-ops to be executed by memory interface execution units may be similar or substantially identical to each another; and the two u-ops to be executed by integer (floating point) execution units may be similar or substantially identical to each another.

Figure 2:
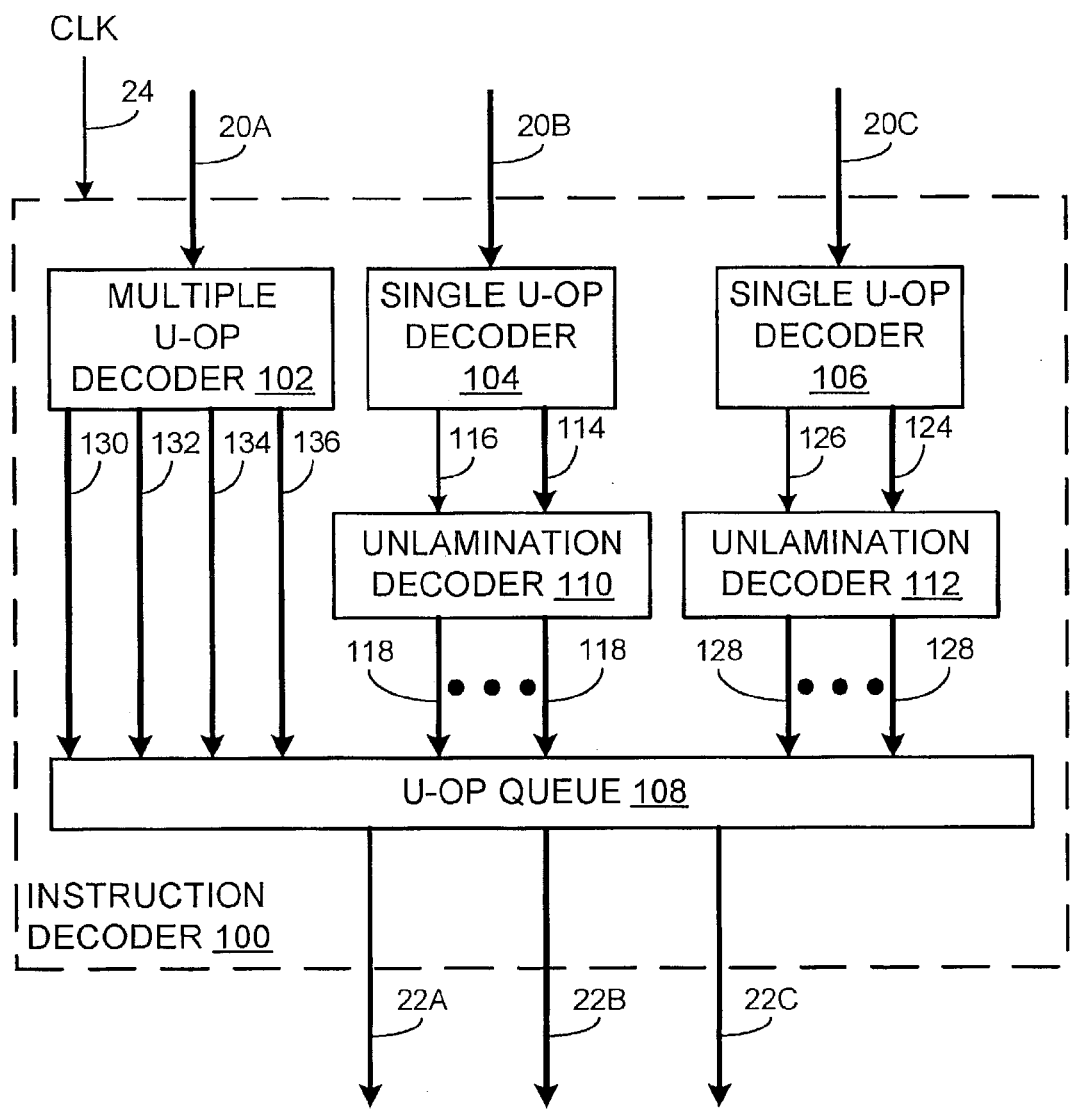
FIGS. 2, 3 and 4 are block-diagram illustrations of instruction decoders according to at least one embodiment of the invention.

FIG. 2 is a simplified block-diagram illustration of an instruction decoder 100 according to at least one embodiment of the invention.

Instruction decoder 100 may include a multiple u-op decoder 102, two single u-op decoders 104 and 106, and a u-op queue 108. Single u-op decoder 104 may be able to decode a macroinstruction into a single u-op, and single u-op decoder 106 may be able to decode a macroinstruction into a single u-op. In contrast, multiple u-op decoder 102 may be able to decode a macroinstruction into up to four u-ops. The u-ops may be sent to u-op queue 108 for storage until they can be sent to OOO core 14.

When at least three u-ops are stored in u-op queue 108, it may send at a clock cycle one u-op via signals 22A, one u-op via signals 22B and one u-op via signals 22C, thus sending three u-ops to OOO core 14 via signals 22. As previously explained, when OOO core 14 receives three u-ops at a clock cycle from instruction decoder 12, the capacity of OOO core 14 may be fully utilized.

When fewer than three u-ops are stored in u-op queue 108, it may send fewer than three u-ops in a clock cycle via signals 22. As previously explained, when OOO core 14 receives fewer than three u-ops at each clock cycle from instruction decoder 12, the capacity of OOO core 14 may not be fully utilized.

The number of u-ops that u-op queue 108 is able send to OOO core 14 each clock cycle may depend on the number of u-ops u-op queue 108 receives each clock cycle. When the number of u-ops u-op queue 108 receives is equal to or greater than three, u-op queue 108 may be able to send to OOO core 14 three u-ops each clock cycle. However, when this number is lower than three, u-op queue 108 may not be able to send to OOO core 14 three u-ops in a clock cycle.

When multiple u-op decoder 102 receives as input via signals 20A a register-to-memory macroinstruction having SSE data type operands, multiple u-op decoder 102 may generate two u-ops to be executed by memory interface execution units, and two u-ops to be executed by integer execution units or floating point execution units. For such macroinstructions, multiple u-op decoder 102 may generate four u-ops in a clock cycle and may send these four u-ops to be placed in u-op queue 108. Even if a sequence of consecutive register-to-memory macroinstructions having SSE operands is received by instruction decoder 12, and all of the macroinstructions in the sequence are decoded by multiple u-op decoder 102 (so that during that time simple u-op decoders 104 and 106 do not decode macroinstructions), u-op queue 108 will receive a sufficient number of u-ops per clock cycle so as to fully utilize the capacity of three u-ops per clock cycle of OOO core 14.

However, when multiple u-op decoder 102 receives as input via signals 20A a register-to-register macroinstruction having SSE data type operands, multiple u-op decoder 102 may generate two u-ops to be executed by integer execution units or floating point execution units. Therefore, for such macroinstructions, multiple u-op decoder 102 may generate two u-ops in a clock cycle, and may send these two u-ops to be placed in u-op queue 108.

If a sequence of consecutive register-to-register macroinstructions having SSE operands is received by instruction decoder 12, and if all of the macroinstructions in the sequence are decoded by multiple u-op decoder 102 (so that during that time simple u-op decoders 104 and 106 do not decode macroinstructions), then u-op queue 108 will receive on average two u-ops per clock cycle and will not be able to fully utilize the capacity of three u-ops per clock cycle of OOO core 14.

Instruction decoder 100 may include an unlamination decoder 110 coupled to single u-op decoder 104 and to u-op queue 108. According to some embodiments of the invention, for certain macroinstructions, single u-op decoder 104 may decode the macroinstruction into a "laminated u-op" and send the laminated u-op to unlamination decoder 110 on signals 114. These macroinstructions share the property that each macroinstruction needs to be ultimately decoded into two or more u-ops to be executed by EUs 16. A laminated u-op is a micro-operation that includes information necessary to generate the two or more u-ops that will be executed by EUs 16. When decoding such a macroinstruction into a laminated u-op, single u-op decoder 104 may generate unlamination information to be sent to unlamination decoder 110 on signals 116. Unlamination decoder 110 may use the unlamination information to generate from the laminated u-op the two or more u-ops that will be executed by EUs 16. Unlamination decoder 110 may send the two or more u-ops to u-op queue 108 via signals 118. Consequently, for certain macroinstructions, single u-op decoder 104 and unlamination decoder 110 may jointly generate two or more u-ops per clock cycle to be placed in u-op queue 108. In some embodiments of the invention, the maximum number of u-ops to be generated by unlamination decoder 110 in a clock cycle may not exceed the maximum number of u-ops to be generated in a clock cycle by multiple u-op decoder 102.

For example, single u-op decoder 104 may decode a register-to-register macroinstruction having SSE operands into a laminated u-op. The u-ops to be generated from the laminated u-op may include a first u-op to be executed by an integer execution unit or a floating point execution unit on a first half of the 128-bit SSE operand, and a second u-op to be executed by an integer execution unit or a floating point execution unit on a second half of the 128-bit SSE operand. In these and other examples, the u-ops generated from the laminated u-op may be similar or identical or may differ only by a few bits, for example, two bits. If this is true for all expected macroinstructions, the architecture of unlamination decoder 110 may be designed to achieve this in a simple manner.

For example, a macroinstruction to add a source 128-bit SSE operand and a destination 128-bit SSE operand and to store the sum in the destination may be decoded into a laminated u-op by single u-op decoder 104. The laminated u-op may include information regarding the source and destination, and the unlamination information may to add the low bits and to add the high bits. Therefore, unlamination decoder 110 may generate a first addition u-op to be executed by an integer EU or a floating point EU on an operand consisting of the low bits of the source SSE operand and an operand consisting of the low bits of the destination SSE operand. Unlamination decoder 110 may also generate a second addition u-op to be executed by an integer EU or a floating point EU on an operand consisting of the high bits of the source SSE operand and an operand consisting of the high bits of the destination SSE operand.

In another example, a macroinstruction to shuffle a source 128-bit SSE operand and a destination 128-bit SSE operand may be decoded into a laminated u-op including information regarding the source and destination. The unlamination information may indicate that the first u-op to be generated by unlamination decoder 110 is to shuffle the low bits of the source and the high bits of the source and to put the result in the high bits of the destination, and that the second u-op to be generated by unlamination decoder 110 is to shuffle the low bits of the destination and the high bits of the destination and to put the result in the low bits of the destination. In such an example, there may be little similarity between the bits of the laminated u-op and the bits of the u-ops generated by unlamination decoder 110.

In a further example, a macroinstruction to move an operand from memory to a register and to zero the high part of the register may be decoded into a laminated u-op including information regarding the source and destination. The unlamination information may enable unlamination decoder 110 to generate a first u-op that, when executed by one of EUs 16, moves the operand from the source to the destination and a second u-op that, when executed by one of EUs 16, does a XOR operation of the high bits of the destination with themselves in order to zero the high bits of the destination.

For macroinstructions received via signals 20B and decoded by single u-op decoder 104 into a single u-op, the single u-op may be sent via signals 114 and unlamination decoder 110 may forward the single u-op unchanged on signals 118 to u-op queue 108.

Instruction decoder 100 may also include an unlamination decoder 112 coupled to single u-op decoder 106 and to u-op queue 108. According to some embodiments of the invention, for certain macroinstructions, single u-op decoder 106 may decode the macroinstruction into a laminated u-op and send the laminated u-op to unlamination decoder 112 on signals 124. These macroinstructions share the property that each needs to be ultimately decoded into two or more u-ops to be executed by EUs 16. When decoding such a macroinstruction into a laminated u-op, single u-op decoder 106 may generate unlamination information to be sent to unlamination decoder 112 on signals 126. Unlamination decoder 112 may use the unlamination information to generate from the laminated u-op the two or more u-ops that will be executed by EUs 16. Unlamination decoder 112 may send the two or more u-ops to u-op queue 108 via signals 128. Consequently, for certain macroinstructions, single u-op decoder 106 and unlamination decoder 112 may jointly generate two or more u-ops per clock cycle to be placed in u-op queue 108. In some embodiments of the invention, the maximum number of u-ops to be generated by unlamination decoder 112 in a clock cycle may not exceed the maximum number of u-ops to be generated in a clock cycle by multiple u-op decoder 102.

If a sequence of consecutive register-to-register macroinstructions having SSE operands is received by instruction decoder 100, and if the macroinstructions in the sequence are evenly divided between signals 20B, and 20C, so that on average the same number of macroinstructions in the sequence are decoded by single u-op decoder 104 as by single u-op decoder 106, then u-op queue 108 will receive on average four u-ops per clock cycle, and will be able to fully utilize the capacity of three u-ops per clock cycle of OOO core 14.

Moreover, if a sequence of consecutive register-to-register macroinstructions having SSE operands is received by instruction decoder 100, and if the macroinstructions in the sequence are evenly divided between signals 20A, 20B and 20C, so that on average the same number of macroinstructions in the sequence are decoded by multiple u-op decoder 102 as by single u-op decoder 104 and as by single u-op decoder 106, then u-op queue 108 will receive on average six u-ops per clock cycle and will be able to fully utilize the capacity of three u-ops per clock cycle of OOO core 14.

U-op queue 108 may receive the u-ops decoded by multiple u-op decoder 102 via signals 130, 132, 134 and 136. U-op queue 108 may be implemented as first-in-first-out (FIFO) circuitry. If, for example, multiple u-op decoder 102 decodes a particular macroinstruction into one u-op that is sent via signals 130, then u-op queue 108 will ignore the invalid signals on 132, 134 and 136 and will store the u-op from signals 118 next to the u-op sent via signals 130.

Figure 3:
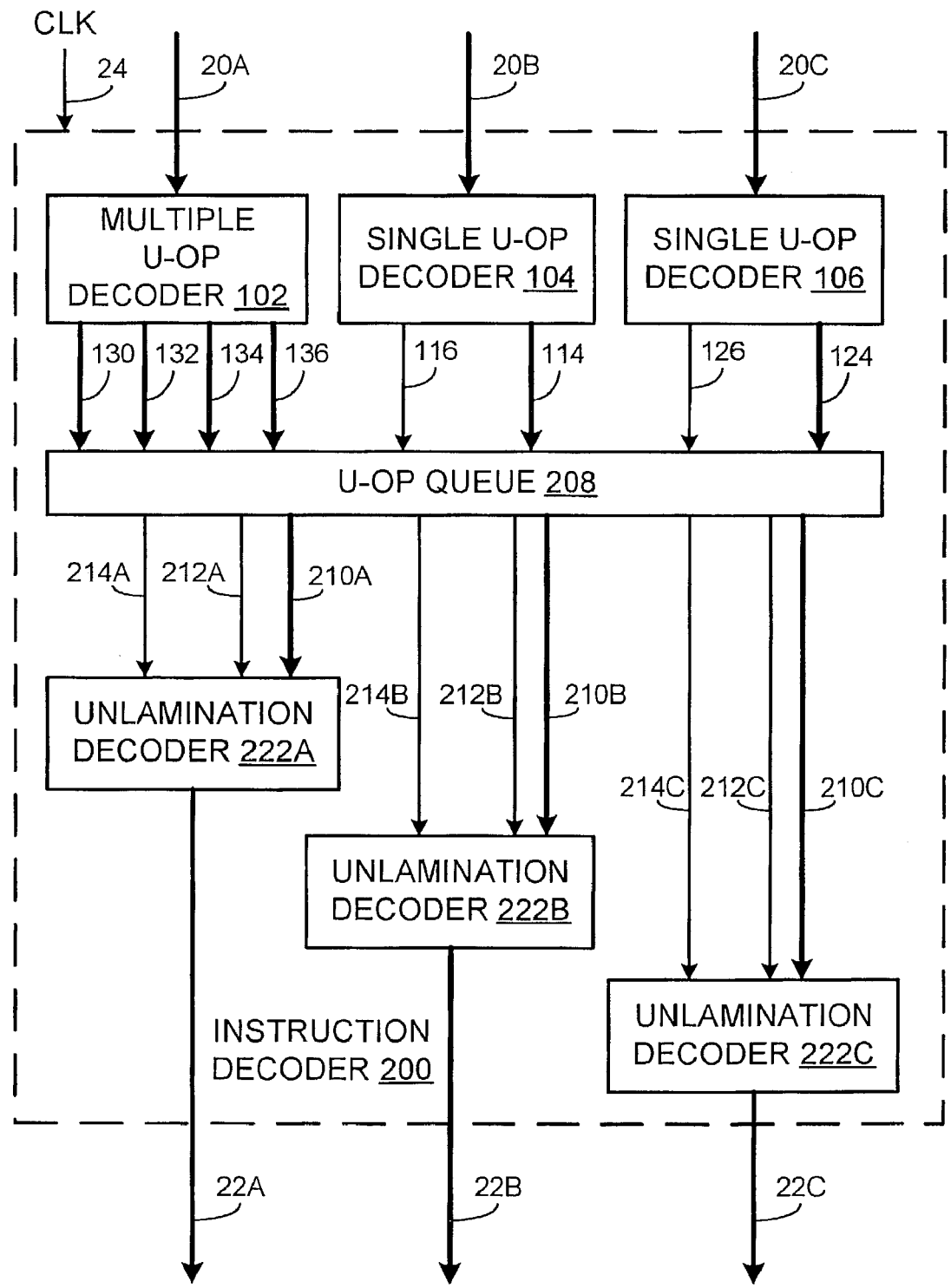

FIG. 3 is a simplified block-diagram illustration of an instruction decoder 200 according to at least one embodiment of the invention.

Instruction decoder 200 may include multiple u-op decoder 102, single u-op decoder 104, single u-op decoder 106, and a u-op queue 208. Instruction decoder 200 may further include unlamination decoders 222A, 222B and 222C.

At each clock cycle, u-op queue 208 may receive and store no u-op or up to four u-ops decoded by multiple u-op decoder 102 via signals 130, 132, 134 and 136.

In addition, at each clock cycle, u-op queue 208 may receive and store no u-op or one u-op decoded by single u-op decoder 104 via signals 114. When single u-op decoder 104 generates a laminated u-op, u-op queue 208 may receive and store both a laminated u-op via signals 114 and the corresponding unlamination information via signals 116 at the same clock cycle.

Similarly, at each clock cycle, u-op queue 208 may receive and store no u-op or one u-op decoded by single u-op decoder 106 via signals 124. When single u-op decoder 106 generates a laminated u-op, u-op queue 208 may receive and store both a laminated u-op via signals 124 and the corresponding unlamination information via signals 126 at the same clock cycle.

At each clock cycle, u-op queue 208 may output no u-op or one u-op via signals 210A to unlamination decoder 222A, no u-op or one u-op via signals 210B to unlamination decoder 222B and no u-op or one u-op via signals 210C to unlamination decoder 222C.

When u-op queue 208 outputs a u-op via signals 210A, 210B or 210C, u-op queue 208 may generate and output decoding information via signals 214A, 214B or 214C, respectively, as will be explained hereinbelow.

In addition, if the u-op that u-op queue 208 outputs via signals 210A, 210B or 210C is a laminated u-op, u-op queue 208 may output to unlamination decoder 222A, 222B or 222C, respectively, the corresponding unlamination information of this laminated u-op via signals 212A, 212B or 212C, respectively.

Unlamination decoders 222A, 222B and 222C may be similar, therefore only unlamination decoder 222A will be described in detail. When unlamination decoder 222A receives via signals 210A a u-op that is not a laminated u-op, the decoding information generated on signals 214A may identify the u-op as a non laminated u-op. Consequently, unlamination decoder 222A may forward unchanged the u-op received via signals 210A on signals 22A.

As previously explained, a laminated u-op is decoded from a macroinstruction that needs to be ultimately decoded into two or more u-ops to be executed by EUs 16. Therefore, when it is time for u-op queue 208 to send a stored laminated u-op to unlamination decoder 222A, u-op queue 208 may send two or more copies of the laminated u-op and its corresponding unlamination information to unlamination decoder 222A via signals 210A and 212A, respectively. U-op queue 208 may also send corresponding decoding information via signals 214A indicating which copy is being sent on signals 210A and identifying the u-op as a laminated u-op. When unlamination decoder 222A receives a copy of a laminated u-op, unlamination decoder 222A may use the laminated u-op, the unlamination information, and the decoding information indicating which copy was received to generate the appropriate u-op to be sent on signals 22A for execution by one of the EUs 16. The u-ops generated by the unlamination decoders from the copies of the same laminated u-op may be similar, identical, or completely different.

U-op queue 208 may not be limited to forwarding all copies of a laminated u-op to the same unlamination decoder. For example, u-op queue 208 may output the first copy of a laminated u-op to one of unlamination decoders 222, and at the same clock cycle u-op queue 208 may output the second copy of the same laminated u-op to another unlamination decoder 222. In another example, u-op queue 208 may output the first copy of a laminated u-op to one of unlamination decoders 222, and at another clock cycle u-op queue 208 may output the second copy of the same laminated u-op to the same unlamination decoder or to any of the other unlamination decoders 222. For example, if the first copy is sent to unlamination decoder 222C, then in the next clock cycle, u-op queue 208 may send the second copy to unlamination decoder 222A.

If a sequence of consecutive register-to-register macroinstructions having SSE operands is received by instruction decoder 200, and if the macroinstructions in the sequence are evenly divided between signals 20B and 20C, so that on average the same number of macroinstructions in the sequence are decoded by single u-op decoder 104 as by single u-op decoder 106, then u-op queue 208 will receive on average two laminated u-ops per clock cycle.

For such sequences of macroinstructions and for similar sequences, u-op queue 208 may send on average three u-ops per clock cycle to unlamination decoders 222—two copies of one laminated u-op, and one copy of another laminated u-op. Consequently, unlamination decoders 222 may output three u-ops per clock cycle via signals 22 and will be able to fully utilize the capacity of three u-ops per clock cycle of OOO core 14.

Moreover, if a sequence of consecutive register-to-register macroinstructions having SSE operands is received by instruction decoder 200, and if the macroinstructions in the sequence are evenly divided between signals 20A, 20B and 20C, so that on average the same number of macroinstructions in the sequence are decoded by multiple u-op decoder 102 as by single u-op decoder 104 and as by single u-op decoder 106, then u-op queue 208 will receive on average three laminated u-ops per clock cycle.

For such sequences of macroinstructions, and for similar sequences, u-op queue 208 may send on average three u-ops per clock cycle to unlamination decoders 222—two copies of one laminated u-op, and one copy of another laminated u-op. Consequently, unlamination decoders 222 may output three u-ops per clock cycle via signals 22 and will be able to fully utilize the capacity of three u-ops per clock cycle of OOO core 14.

Figure 4:
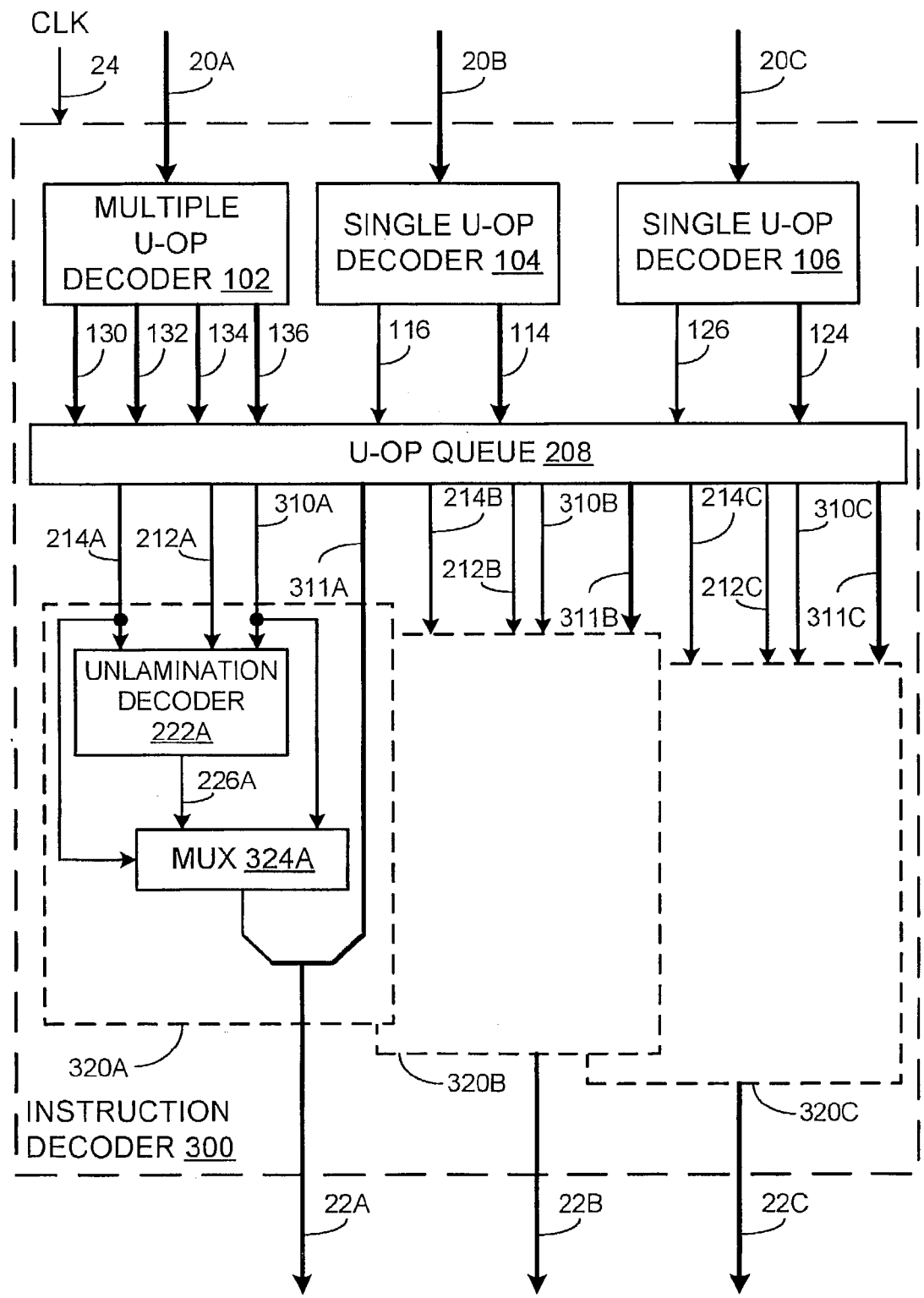

FIG. 4 is a simplified block-diagram illustration of an instruction decoder 300 according to at least one embodiment of the invention. Instruction decoder 300 is similar to instruction decoder 200 of FIG. 3, but has certain differences. Although embodiments of the invention are not limited in this respect, the embodiment shown in FIG. 4 may be suitable when the u-ops ultimately decoded from a macroinstruction differ only by a relatively small number of bits from the laminated u-op initially decoded from the macroinstruction. In the following description, the example of differing only by two bits will be used for clarity of explanation, although embodiments of the invention are not limited in this respect.

Instruction decoder 300 may include logic blocks 320A, 320B and 320C, each including an unlamination decoder 222 and a multiplexer 324. When u-op queue 208 forwards a stored u-op so that the u-op will be output by instruction decoder 300, all but two bits of the u-op are forwarded on signals 311A, 311B or 311C to logic block 320A, 320B or 320C, respectively. The bits on signals 311 are output by logic block 320 unchanged to form part of the bits on signals 22. The two bits of the u-op not forwarded on signal 311 may be forwarded on signals 310.

When u-op queue 208 forwards a stored u-op to logic block 320A, and the stored u-op is not a laminated u-op, then as before, the decoding information generated by u-op queue 208 and sent on signals 214A may include an indication that the u-op is not a laminated u-op. Multiplexer 324A may then forward the two bits of the u-op on signals 31A, to be output jointly with the bits of the u-op on signals 311A by instruction decoder 300 on signals 22A.

Figure 7:
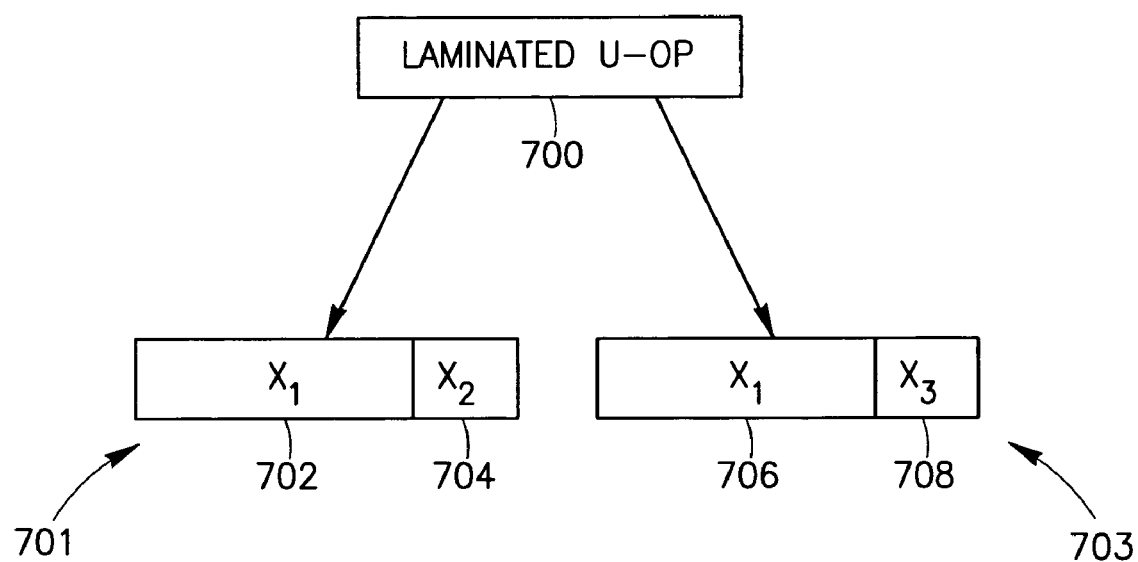
FIG. 7 is a conceptual illustration of two micro-operations unlaminated from a laminated micro-operation according to some demonstrative embodiments of the invention.

When u-op queue 208 forwards a stored laminated u-op to logic block 320A, then the decoding information generated by u-op queue 208 and sent on signals 214A may include an indication that the u-op is a copy of a laminated u-op and may include an indication which copy is being sent. Unlamination decoder 222A may generate from the two bits of the u-op received from signals 310A two new bits that are appropriate for the u-op to be generated. Unlamination decoder 222A may output the two new bits on signals 226A. Multiplexer 324A may then forward the two new bits received from signals 226A, to be output jointly with the bits of the u-op on signals 311A by instruction decoder 300 on signals 22A. For example, as shown in FIG. 7, a laminated u-op 700 may be unlaminated, e.g., by logic block 320A, into a first u-op 701 and a second u-op 703. U-ops 701 and 703 may differ by any suitable number of bits, e.g., up to two bits. For example, a first part 702 of u-op 701 and a first part of u-op 703 may each include the same set of bits, denoted $X_1$. A second part 704 of u-op 701 may include a set $X_2$ of bits, e.g., up to two bits, different than a set $X_3$ of bits, e.g., up to two bits, which may be included in a second part 708 of u-op 703.

In the foregoing description of embodiments of the invention, the maximum number of macroinstructions that instruction decoder 12 may receive from instruction cache memory 10 at each clock cycle is three, and the capacity of OOO core 14 is three u-ops per clock cycle. However, this is merely an example, and in other embodiments of the invention, this number and capacity may be different. It will be obvious to a person of ordinary skill in the art how to modify the embodiments described hereinabove for a different maximum number of macroinstructions to be received by the instruction decoder per clock cycle and a different capacity of the out-of-order core.

Figure 5:
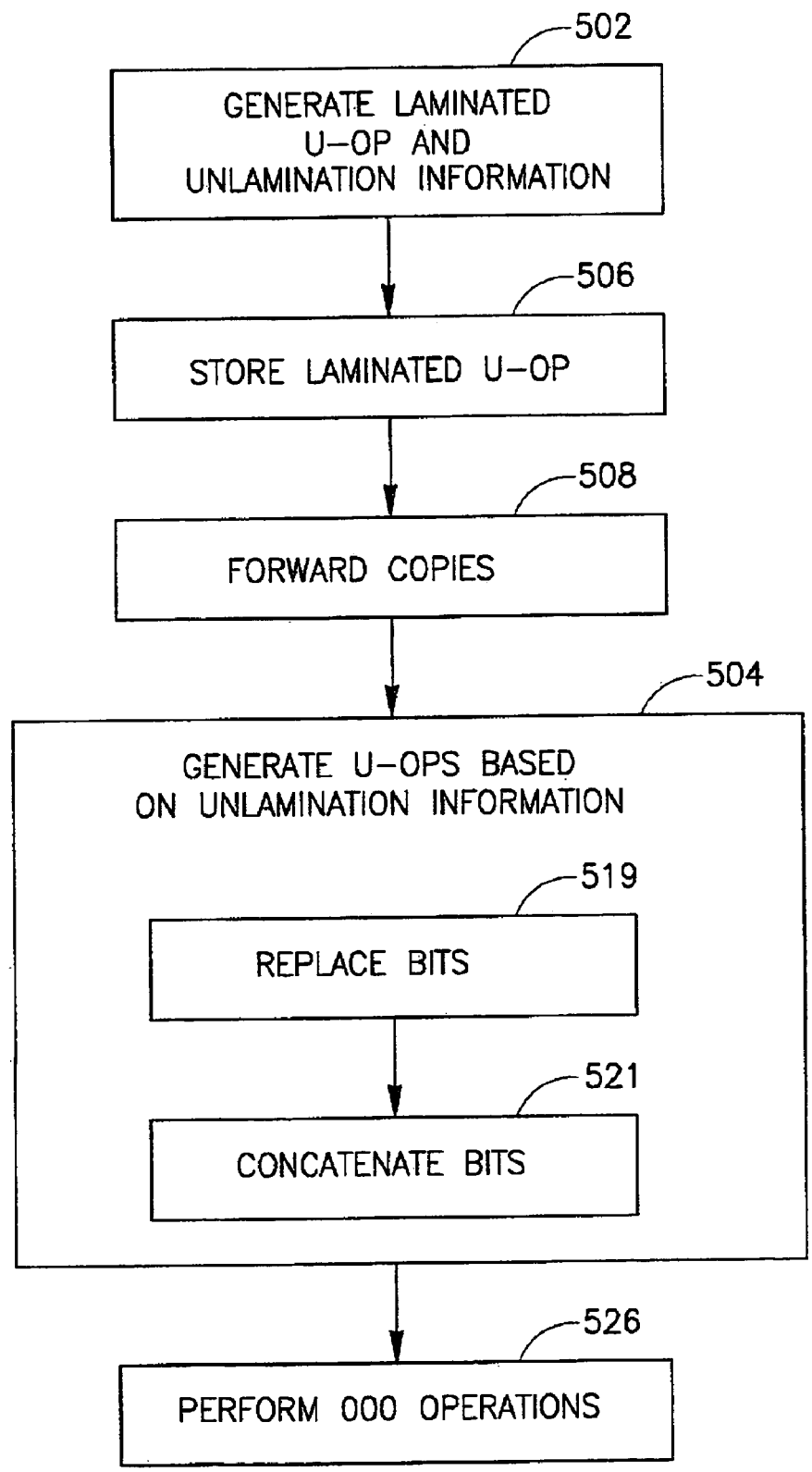
FIG 5 is a schematic flow chart of a method of decoding a macro instruction according to some embodiments of the invention.

Reference is now made to FIG. 5, which schematically illustrates a method of decoding a macro instruction according to some embodiments of the invention. As indicated at block 502, the method may include, for example, generating a laminated micro-operation and corresponding unlamination information from a macro instruction. The macroinstruction may include, for example, streaming single-instruction-multiple-data extensions data type operands, e.g., as described above: The unlamination information may include, for example, information indicating two or more micro-operations to be generated from the laminated micro-instruction, e.g., as described above. As indicated at block 504, the method may also include generating the two or more micro-operations from the laminated micro-operation, for example, based on the unlamination information, e.g., as described above.

As indicated at block 506, the method may also include storing the laminated micro operation, e.g., as described above. As indicated at block 508, the method may also include forwarding two or more copies of the laminated micro-operation along with decoding information, e.g., indicating which copy is being forwarded, as described above. In one example, the two or more copies may be forwarded in the same clock cycle. In another example, forwarding the two or more copies may occur in different clock cycles at a same output of an instruction decoder. In yet another example, forwarding the two or more copies may occur in different clock cycles at different outputs of an instruction decoder.

As indicated at block 519 for at least one of the two or more micro-operations the method may include replacing selected bits of a corresponding one of the two or more copies of the laminated micro-operation according to the unlamination information and the decoding information. The method may also include, for example, concatenating the replaced bits with the unselected bits of the corresponding copy of the laminated micro-operation, as indicated at block 521. As indicated at block 526, the method may also include performing OOO operations on the two or more micro-operations. For example, OOO core 14 (FIG. 1) may be used to perform the one or more OO operations.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method comprising:
   generating a laminated micro-operation and corresponding unlamination information from a macroinstruction, said unlamination information indicating how to unlaminate said laminated micro-operation into two or more micro-operations;
   storing said laminated micro-operation;
   forwarding two or more copies of said laminated micro-operation alone with decoding information indicating which copy is being forwarded; and generating said two or more micro-operations from said copies based on said unlamination information, said micro-operations being different.

2. The method of claim 1, wherein said two or more micro-operations are to operate on two or more respective parts of an operand of said macroinstruction.

3. The method of claim 1, wherein forwarding said two or more copies occur in a same clock cycle.

4. The method of claim 1, wherein forwarding said two or more copies occur in different clock cycles at a same output of an instruction decoder.

5. The method of claim 1, wherein forwarding said two or more copies occur in different clock cycles at different outputs of an instruction decoder.

6. The method of claim 1, wherein, for at least one of said two or more micro-operations, generating said micro-operation comprises:
   replacing selected bits of a corresponding one of said two or more copies of said laminated micro-operation according to said unlamination information and said decoding information; and
   concatenating said replaced bits wit the unselected bits of said corresponding copy of said laminated micro-operation.

7. An apparatus comprising:
   a first decoder to decode a macroinstruction into a laminated micro-operation and to generate unlamination information for said laminated micro-operation, said unlamination information indicating how to unlaminate said laminated micro-operation into two or more micro-operations;
   micro-operation queue circuitry to receive said laminated micro-operation from said first decoder, and to forward two or more copies of said laminated micro-operation; and
   a second decoder to generate said two or more micro-operations from said copies based on said unlamination information, said micro-operations being different.

8. The apparatus of claim 7, wherein said two or more micro-operations are to operate on two or more respective parts of an operand of said macroinstruction.

9. The apparatus of claim 7, wherein said micro-operation queue circuitry is to generate decoding information indicating which copy of said laminated micro-operation is to be forwarded.

10. The apparatus of claim 7, wherein said second decoder is to generate at least one of said two or more micro-operations by replacing selected bits of a corresponding one of said two or more copies of said laminated micro-operation according to said unlamination information and said decoding information, and concatenating said replaced bits with the unselected bits of said corresponding copy of said laminated micro-operation.

11. The apparatus of claim 7, wherein said two or more micro-operations differ by up to two bits.

12. An apparatus comprising:
   a voltage monitor;
   a system memory to store macroinstructions; and
   a processor having an instruction decoder able to output up to three micro-operations in a single clock cycle, said instruction decoder including at least:
      a first decoder to decode a macroinstruction into a laminated micro-operation and to generate unlamination information for said laminated micro-operation, said unlamination information indicating how to unlaminate said laminated micro-operation into two or more micro-operations;
      micro-operation queue circuitry to receive said laminated micro-operation from said first decoder, and to forward two or more copies of said laminated micro-operation; and
      a second decoder to generate said two or more micro-operations from said copies based on said unlamination information, said micro-operations different.

13. The apparatus of claim 12, wherein wherein said two or more micro-operations are to operate on two or more respective parts of an operand of said macroinstruction.

14. The apparatus of claim 12, wherein said micro-operation queue is to generate decoding information indicating which copy of said laminated micro-operation is to be forwarded.

15. The apparatus of claim 12, wherein said second decoder is to generate at least one of said two or more micro-operations by replacing selected bits of a corresponding copy of said laminated micro-operation according to said unlamination information and said decoding information, and concatenating said replaced bits with the unselected bits of said corresponding copy of said laminated micro-operation.

16. The apparatus of claim 12, wherein said two or more micro-operations differ by up to two bits.

17. The method of claim 1, wherein generating said two or more micro-operations comprises generating said two or more micro-operations prior to performing any renaming operation corresponding to said macroinstruction.

18. The apparatus of claim 7, further comprising:
   an out-of-order core to perform out-of-order operations on said two or more micro-operations, wherein said second decoder generates said two or more micro-operations prior to the performance of any renaming operation corresponding to said macroinstruction.

19. The apparatus of claim 12, further comprising:
   an out-of-order core to perform out-of-order operations on said two or more micro operations, wherein said second decoder generates said two or more micro-operations prior to the performance of any renaming operation corresponding to said macroinstruction.

20. The method of claim 1, wherein at least one of said two or more micro-operations is to operate on a half of said operand.

21. The method of claim 1, wherein said operand comprises a streaming single-instruction-multiple-data extensions data type operand.

22. The apparatus of claim 7, wherein at least one of said two or more micro-operations is to operate on a half of said operand.

23. The apparatus of claim 7, wherein said operand comprises a streaming single-instruction-multiple-data extensions data type operand.

* * * * *